United States Patent [19]
Hirai

[11] Patent Number: 5,913,087
[45] Date of Patent: Jun. 15, 1999

[54] INDICATING APPARATUS WITHIN VIEWFINDER OF SINGLE LENS REFLEX CAMERA

[75] Inventor: Isamu Hirai, Tokyo, Japan

[73] Assignee: Asahi Kogaku Kogyo Kabushiki Kaisha, Tokyo, Japan

[21] Appl. No.: 08/939,100

[22] Filed: Sep. 26, 1997

[30] Foreign Application Priority Data

Oct. 17, 1996 [JP] Japan .................................. 8-295762

[51] Int. Cl.⁶ .................................................. G03B 17/20
[52] U.S. Cl. ............................................................ 396/296
[58] Field of Search ............................................. 396/296

[56] References Cited

U.S. PATENT DOCUMENTS 4,949,118  8/1990  Yamamoto et al. ................. 396/296 X
5,488,446  1/1996  Kirigaya et al. .

FOREIGN PATENT DOCUMENTS 6324393  11/1994  Japan .

*Primary Examiner*—W. B. Perkey
*Attorney, Agent, or Firm*—Greenblum & Bernstein P.L.C.

[57] ABSTRACT

An indicating apparatus within a viewfinder of a single lens reflex camera has a quick return mirror, which reflects light from an object passing through a photographing lens to form an object image on a focusing glass, and a viewfinder optical system, through which the object image can be observed. The quick return mirror can be rotated between an inclined viewing position and a horizontal or photographing position. A photographing information projector projects an image of photographing information on a predetermined position of the finder screen. The photographing information projector is disposed on a straight line connecting a predetermined point included in a plane corresponding to the exit pupil and a predetermined arbitrary point included in the predetermined position when the optical axis is optically developed.

13 Claims, 4 Drawing Sheets

INDICATING APPARATUS WITHIN VIEWFINDER OF SINGLE LENS REFLEX CAMERA

BACKGROUND OF THE INVENTION

1. Field of the Invention

The present invention relates to a superimposing indicator in which photographing information is superimposed and indicated on an object image within a viewfinder in a single reflex camera.

2. Description of the Related Art

A conventional superimposing indicator within a viewfinder of a single reflex camera is disclosed in U.S. Pat. No. 5,488,446. FIGS. 1 and 2 show an optical system mounted in a single reflex camera, disclosed in the above mentioned publication, where FIG. 2 shows a development of the optical system. Regarding the indicator within the viewfinder, as shown in these drawings, a photographing information projector 50 is disposed close to a tip portion of a quick return mirror 40, which is set in an inclined condition. The photographing information projector 50 has a light emitting diode 51, an information chart 52, which is in front of and illuminated by the light emitting diode 51, and a projecting lens 53 which is disposed in front of the information chart 52. An image indicating photographing information, i.e. a character or the like, is formed in the information chart 52, so that the image of the photographing information is formed on a focusing glass 41, disposed adjacent to the quick return mirror 40, as light is radiated by the emitting diode 51. This photographing information, which is superimposed on an object image obtained through a photographing optical system 43, can be viewed through an eyepiece 42 included in the viewfinder.

Thus, the conventional photographing information projector 50 is disposed so as to be offset with respect to an edge portion of the focusing glass 41, and thus, the projection path of the photographing information does not interfere with the quick return mirror 40. Namely, a bundle of rays K1, passing through the photographing optical system 43, and a bundle of rays K2, radiated from the photographing information projector 50, are made incident on the focusing glass 41 at different angles from each other.

The focusing glass 41 is provided with a Fresnel lens, so that a major portion of the bundle of rays K1, directed from the photographing optical system 43, is directed to the eyepiece 42. However, the bundle of rays directed from the photographing information projector 50 to the eyepiece 42 is very small. Therefore, in the viewfinder, the indication of the photographing information tends to be dark, hindering viewing of the photographing information at various positions of the eye E of the photographer relative to the eyepiece 42.

SUMMARY OF THE INVENTION

Therefore, an object of the invention is to provide an indicating apparatus within a viewfinder, in which an indication of the photographing information in the viewfinder is bright, so as to be easily viewed.

According to the present invention, there is provided an indicating apparatus within a viewfinder of a single reflex camera, comprising an image forming optical system, a condenser lens and a photographing information projector.

The image forming optical system leads a light beam, passing through a photographing optical system, to a finder screen, so that an object image is formed on the finder screen and can be observed through an eyepiece of the viewfinder.

The condenser lens, which is provided close to the finder screen, creates an optical phase conjugation between an exit pupil of the photographing optical system and a pupil of the eyepiece. The photographing information projector projects an image of photographing information on a projecting area which is included in the finder screen. The photographing information projector is disposed in such a manner that a principal ray of a bundle of rays, which is emitted by the photographing information projector to form the image of photographing information, is approximately coincident with a straight line connecting an arbitrary point included in a plane corresponding to the exit pupil and an arbitrary point included in the projecting area when the optical axis is optically developed.

Further, according to the present invention, there is provided an indicating apparatus within a viewfinder of a single reflex camera, in which a light beam passing through a photographing optical system is reflected by a mirror to become incident on a finder screen, so that an object image is formed on the finder screen and can be observed through an eyepiece. The indicating apparatus comprises a condenser lens and a photographing information projector.

The condenser lens, which is provided close to the finder screen, creates an optical phase conjugation between an exit pupil of the photographing optical system and a pupil of the eyepiece. The photographing information projector projects an image of photographing information on a predetermined position of the finder screen. The photographing information projector is disposed in such a manner that a principal ray of a bundle of rays, which is emitted by the photographing information projector to form the image of photographing information, is approximately coincident with a straight line connecting an arbitrary point included in a plane corresponding to the exit pupil and a predetermined point included in a plane of the predetermined position when the optical axis is optically developed.

Furthermore, according to the present invention, there is provided an indicating apparatus within a viewfinder of a single reflex camera, in which a light beam passing through a photographing optical system is directed to a finder screen, so that an object image is formed on the finder screen and can be observed through an eyepiece. The indicating apparatus comprises a condenser lens and a photographing information projector.

The condenser lens, which is provided close to the finder screen, creates an optical phase conjugation between an exit pupil of the photographing optical system and a pupil of the eyepiece. The photographing information projector projects an image of photographing information on a predetermined position of the finder screen. The photographing information projector is disposed on a straight line connecting an arbitrary point included in a plane corresponding to the exit pupil and an arbitrary point included in the predetermined position when the optical axis is optically developed.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
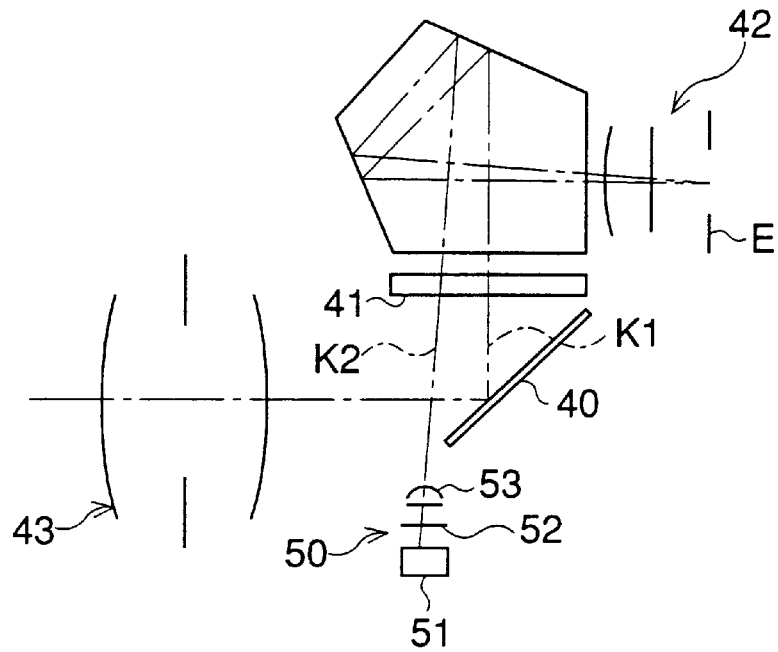
FIG. 1 is an illustration showing an optical system of the prior art including a conventional indicator within a viewfinder in a single reflex camera.
Figure 2:
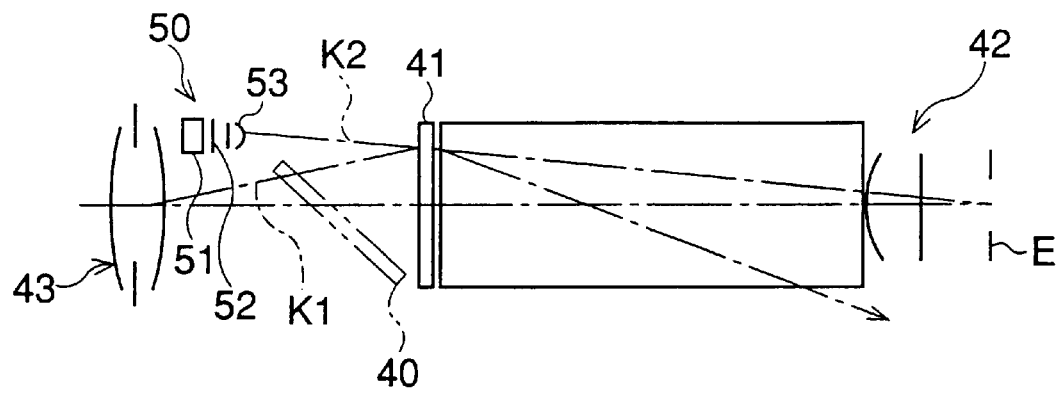
FIG. 2 is an illustration showing the prior art optical system shown in FIG. 1, with an optically developed optical system provided in the camera.

The present invention will be described below with reference to embodiments shown in the drawings.

Figure 3:
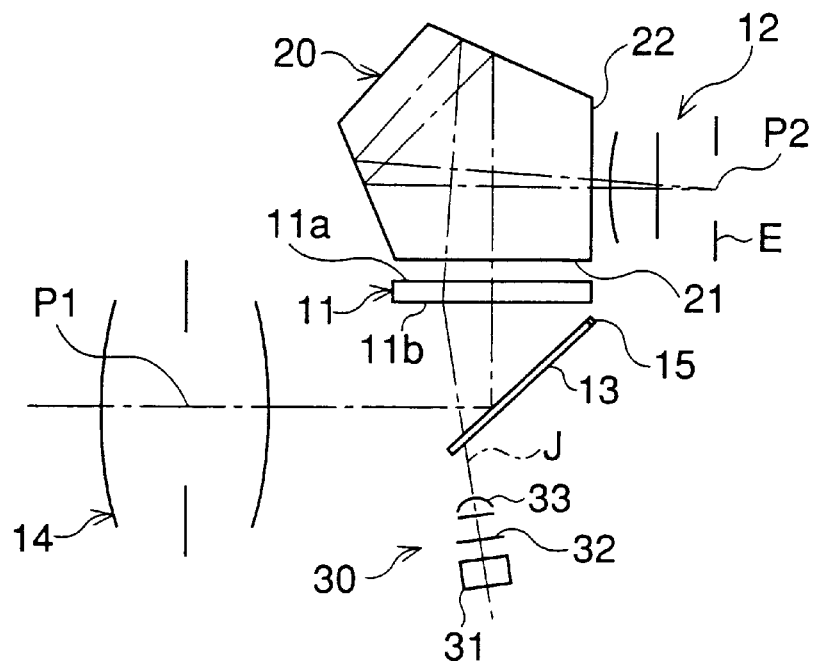
FIG. 3 is an illustration showing an optical system mounted in a single reflex camera to which an embodiment of the present invention is applied.
Figure 4:
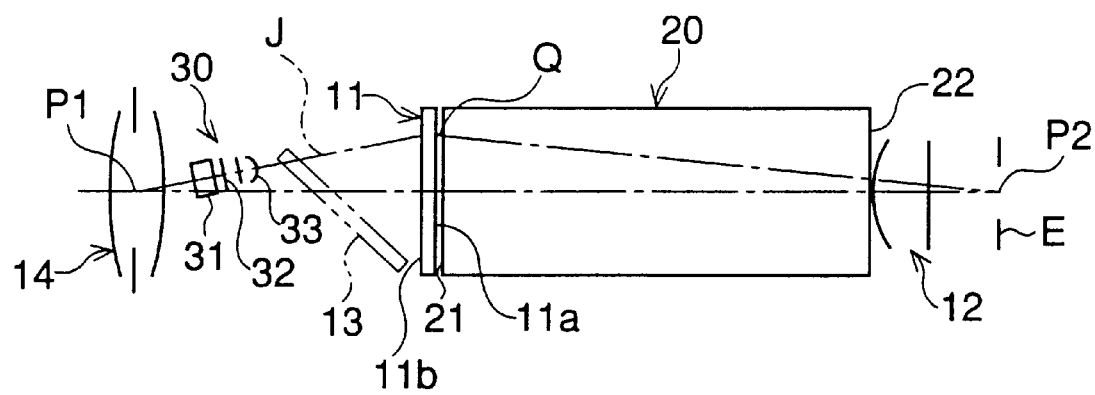
FIG. 4 is an illustration showing the optical system, shown in FIG. 3, with an optically developed optical system provided in the camera.

FIG. 3 shows an optical system mounted in a single reflex camera to which an embodiment of the present invention is applied. FIG. 4 shows the optical system, shown in FIG. 3, with a development of the optical system provided in the camera.

A focusing glass 11 is positioned to face an incident plane 21, which, in FIG. 3, is a lower surface of a pentagonal prism 20, and an eyepiece 12 of a viewfinder is positioned to face an emergent plane 22, which is a rear surface of the pentagonal prism 20. A quick return mirror 13 is disposed adjacent to the focusing glass 11, and a photographing optical system 14 is provided in front of the quick return mirror 13. The quick return mirror 13, which is a half-mirror, is supported by a support shaft 15 provided close to the emergent plane 22 of the pentagonal prism 20, in FIG. 3, so that the quick return mirror 13 can be rotated between an inclined position and a horizontal position, in which the quick return mirror 13 is parallel to the focusing glass 11.

An upper surface 11a of the focusing glass 11, which faces the incident plane 21 of the pentagonal prism 20, is a frosted diffusing surface. A condenser lens, which is a Fresnel lens, is formed on a lower surface 11b of the focusing glass 11. The Fresnel lens creates an optical phase conjugation between an exit pupil P1 of the photographing optical system 14 and a pupil P2 of the eyepiece 12.

In FIG. 3, when the quick return mirror 13 is set to the inclined position and an aperture provided in the photographing optical system 14 is opened, a bundle of rays passing through the photographing optical system 14 is reflected by the quick return mirror 13, and directed to the finder screen, i.e. the upper surface 11a of the focusing glass 11, so that an object image is formed on the finder screen. The object image is observed, by the eye E of a photographer, through the eyepiece 12 via the pentagonal prism 20. Conversely, when the quick return mirror 13 is set to the horizontal or photographing position, a bundle of rays passing through the photographing optical system 14 is directed to pass beneath the quick return mirror 13 to a film surface (not shown), so that the object image is recorded on the film surface, in association with an opening and closing of a shutter (not shown).

A photographing information projector 30 is provided under a tip portion of the quick return mirror 13. The photographing information projector 30 has a light source or a light emitting diode (LED) 31, an information chart 32 which is illuminated by the LED 31, and a projecting lens 33. The information chart 32 is positioned closer to the focusing glass 11 in comparison with the LED 31, and the projecting lens 33 is positioned closer to the focusing glass 11 in comparison with the information chart 32.

Figure 5:
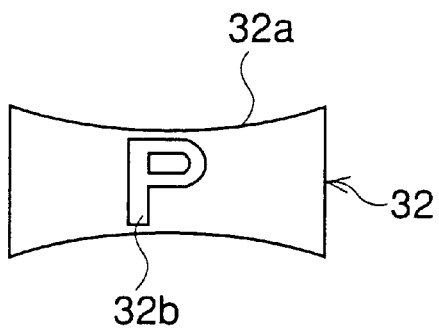
FIG. 5 is an illustration showing an example of an information chart.
Figure 6:
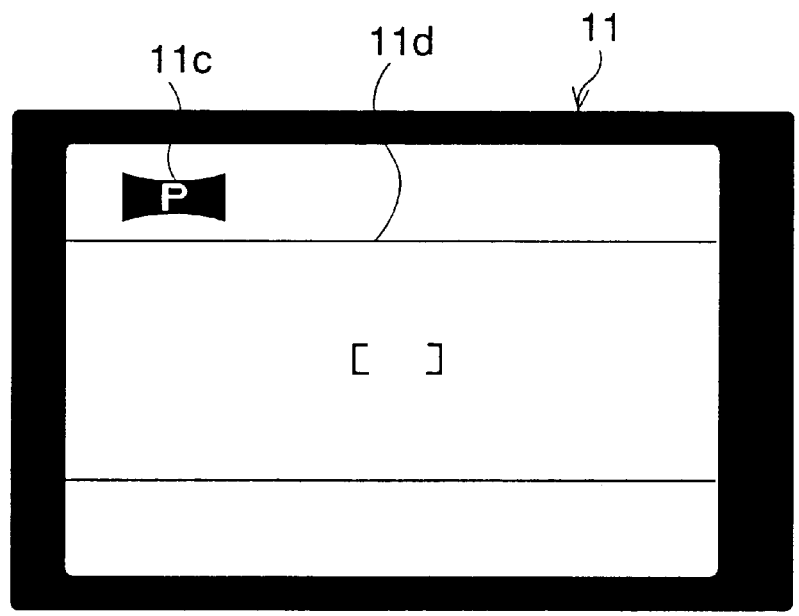
FIG. 6 is an illustration showing an example of the projecting position on a focusing glass, on which an image of the information chart is formed.

An image indicating a character conveying photographing information, such as a shutter speed, is formed in the information chart 32. FIG. 5 shows an example of the information chart 32, in which a circumferential portion 32a contains a black or opaque image of the letter "P", which is formed at a center portion as a character indication 32b. Namely, the circumferential portion 32a has a transmittance higher than that of the character indication 32b. Note that, the letter "P" implies a panoramic mode. The image of the information chart 32 is projected and indicated on a predetermined projecting area of the upper surface 11a (i.e. finder screen) of the focusing glass 11, by the projecting lens 33. The projecting area is beyond an area in which an object image is formed. FIG. 6 shows an example of the focusing glass 11, on which an image of the information chart 32 is formed. The image 11c of the character indication 32b is located outside the panoramic frame lines 11d.

The photographing information projector 30 projects the image of the information chart 32 on the projecting area of the finder screen. As shown in FIG. 4, the photographing information projector 30 is disposed in such a manner that, when the optical axis of the optical system is optically developed, the optical axis of the photographing information projector 30 is approximately coincident with a straight line J. The projecting area is center point P1 of a plane corresponding to the exit pupil of the photographing optical system 14 and the geometric center Q of the projecting area of the finder screen. Namely, a principal ray of a bundle of rays, which is emitted by the photographing information projector 30 to form the image of the information chart 32, is approximately coincident with the straight line J. Thus, a bundle of rays emitted by the LED 31 passes through the quick return mirror 13, so that the photographing information is projected onto the focusing glass 11. Namely, the photographing information projector 30 is disposed on a straight line connecting the center of the exit pupil P1 of the photographing optical system 14 and the geometric center Q of the projecting area.

Figure 7:
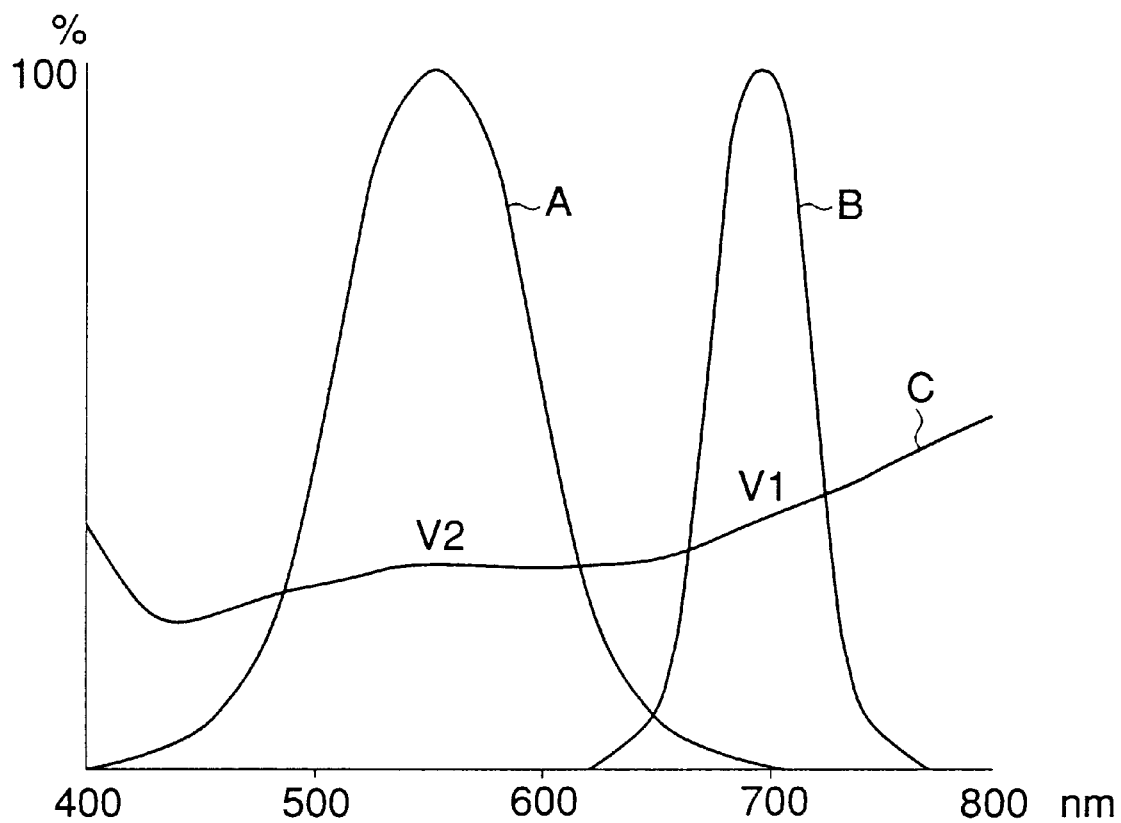
FIG. 7 is a graph showing characteristics associated with the half-mirror which is the quick return mirror.

FIG. 7 shows some characteristics associated with the half-mirror (i.e. the quick return mirror 13). A solid line A indicates a luminosity, a solid line B indicates a distribution of a luminous intensity of the LED 31 of the photographing information projector 30, and a solid line C indicates a transmittance when a bundle of rays enters the half-mirror at 45 degrees (i.e. a 45-degree-transmittance of the half-mirror). In this graph, the abscissa axis indicates a wavelength of a ray (nanometers), and the ordinate axis indicates a percentage. Namely, this graph shows relative values between the associated characteristics.

As shown in this drawing, an average value V1 of the 45-degree-transmittance, in a wavelength range within which the LED 31 radiates, is higher than an average value V2 of the 45-degree-transmittance, in a wavelength range in which an object image can be observed. Therefore, a bundle of rays corresponding to the photographing information projected by the photographing information projector 30 is efficiently passed through the quick return mirror 13, so that the photographing information is projected on the focusing glass. Subseguently, the bundle of rays is directed to the eyepiece 12, whereby clear photographing information is observed.

As described above, according to the embodiment, a bundle of rays corresponding to the photographing information projected by the photographing information projector 30 is efficiently directed to the eyepiece 12, so that the indication of the photographing information in the viewfinder becomes brighter than in a conventional device. Thus the photographing information can be easily viewed. Accordingly, in comparison with the conventional device, the amount of light radiated by the LED 31 can be reduced, so that a current consumption, caused by an emission of the LED 31, can be decreased.

Note that, although the principal ray of the bundle of rays emitted by the photographing information projector 30 is coincident with the optical axis thereof, the principal ray of the photographing information projector 30 does not have to be coincident with the optical axis thereof. In this case, by displacing the information chart 32 in a direction perpendicular to the optical axis of the photographing optical system 14, the position on the focusing screen, where the image of the information chart 32 is formed, can be adjusted to coincide with the projecting area.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-295762 (filed on Oct. 17, 1996) which is expressly incorporated herein by reference, in its entirety.

I claim:

1. An indicating apparatus within a viewfinder of a single lens reflex camera, comprising:
    an image forming optical system that includes a photographing optical system, said image forming optical system leading a light beam, passing through photographing optical system, to a finder screen, so that an object image is formed on said finder screen and can be observed through an eyepiece of said viewfinder;
    a condenser lens, provided close to said finder screen, that makes an exit pupil of said photographing optical system conjugate with a pupil of said eyepiece; and
    a photographing information projector that projects an image of photographing information on a projecting area which is included in said finder screen, Aid projecting area being a peripheral area of said finder screen relative to a center of said finder screen, said photographing information projector being disposed so that a principal ray of a bundle of rays, which is emitted by said photographing information projector to form said image of photographing information, is approximately coincident with a straight line connecting an arbitrary point included in said exit pupil and an arbitrary point included in said projecting area, when an optical axis of said photographing optical system is optically developed.

2. An indicating apparatus according to claim 1, wherein said image forming optical system comprises a half-mirror, and said photographing information projector projects said image of said photographing information via said half-mirror onto said projecting area.

3. An indicating apparatus according to claim 2, wherein said half-mirror has characteristics in which an average value of a 45-degree-transmittance, in a wavelength range within which said image forming optical system radiates, is higher than an average value of said 45-degree-transmittance, in a wavelength range in which an object image can be observed.

4. An indicating apparatus according to claim 1, wherein said arbitrary point of said exit pupil is the center of said exit pupil.

5. An indicating apparatus according to claim 1, wherein said arbitrary point of said projecting area is a geometrical center of said projecting area.

6. An indicating apparatus according to claim 1, wherein said principal ray is approximately coincident with the optical axis of said photographing information projector.

7. An indicating apparatus according to claim 1, wherein said photographing information projector comprises a light source, an information chart illuminated by said light source, and a projecting lens for forming an image included in said information chart, illuminated by said light source, on said finder screen.

8. An indicating apparatus according to claim 1, wherein said condenser lens comprises a Fresnel lens.

9. An indicating apparatus within a viewfinder of a single lens reflex camera, in which a light beam passing through a photographing optical system is reflected by a mirror to become incident on a finder screen, so that an object image is formed on said finder screen and can be observed through an eyepiece, said indicating apparatus comprising:
    a condenser lens, provided close to said finder screen, that makes an exit pupil of said photographing optical system conjugate with a pupil of said eyepiece; and
    a photographing information projector projecting an image of photographing information on a predetermined point which is included in said finder screen, said predetermined point being offset from the center of said finder screen, said photographing information projector being disposed so that a principal ray of a bundle of rays, which is emitted by said photographing information projector to form said image of photographing information, is approximately coincident with a straight line connecting an arbitrary point included in said exit pupil and said predetermined point, when an optical axis of said photographing optical system is optically developed.

10. An indicating apparatus within a viewfinder of a single lens reflex camera, in which a light beam passing through a photographing optical system is directed to a finder screen, so that an object image is formed on said finder screen and can be observed through an eyepiece, said indicating apparatus comprising:
    a condenser lens, provided close to said finder screen, that makes an exit pupil of said photographing optical system conjugate with a pupil of said eyepiece; and
    a photographing information projector projecting an image of photographing information on a predetermined position of said finder screen, said predetermined position being a peripheral position on said finder screen relative to the center of said finder screen, said photographing information projector being disposed on a straight line connecting an arbitrary point included in said exit pupil and an arbitrary point included in said predetermined position, when an optical axis of said photographing optical system is optically developed.

11. The indicating apparatus according to claim 1, wherein said projecting area is outside of an area in which said object image is formed.

12. The indicating apparatus according to claim 9, wherein said predetermined point is outside of an area in which said object image is formed.

13. The indicating apparatus according to claim 10, wherein said predetermined point position is outside of an area in which said object image is formed.

* * * * *